United States Patent
Ort et al.

(10) Patent No.: US 12,301,925 B2
(45) Date of Patent: May 13, 2025

(54) UPDATING MEDIA DEVICES IN A LOCAL NETWORK WITH A CLIENT-SERVER ARCHITECTURE

(71) Applicant: DISH Network L.L.C., Englewood, CO (US)

(72) Inventors: Glen Ort, Lone Tree, CO (US); Alec McDaugale, Parker, CO (US); Geoffrey Kemp, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 185 days.

(21) Appl. No.: 17/887,055

(22) Filed: Aug. 12, 2022

(65) Prior Publication Data
US 2023/0052217 A1  Feb. 16, 2023

Related U.S. Application Data

(60) Provisional application No. 63/232,552, filed on Aug. 12, 2021.

(51) Int. Cl.
*H04N 21/433* (2011.01)
*G06F 8/41* (2018.01)
(Continued)

(52) U.S. Cl.
CPC ............ *H04N 21/433* (2013.01); *G06F 8/45* (2013.01); *G06F 8/451* (2013.01); *G06F 8/453* (2013.01);
(Continued)

(58) Field of Classification Search
CPC ............ H04N 21/433; H04N 21/4518; H04N 21/238; H04N 21/26291; H04N 21/2665;
(Continued)

(56) References Cited

U.S. PATENT DOCUMENTS

| 7,617,515 B1 | 11/2009 | Laksono |
| 8,863,202 B2 | 10/2014 | Agnihotri et al. |

(Continued)

FOREIGN PATENT DOCUMENTS

| CN | 108259231 A | * | 7/2018 |
| WO | 2017/102389 A1 | | 6/2017 |

OTHER PUBLICATIONS

Thomson et al RFC 4862 "IPv6 Stateless Address Autoconfiguration" Network working Group (Year: 2007) 30 pages.
(Continued)

*Primary Examiner* — Nicholas T Corbo
(74) *Attorney, Agent, or Firm* — Kilpatrick Townsend & Stockton LLP

(57) ABSTRACT

Systems, methods, and non-transitory, machine-readable media to facilitate updating media devices in a local network with a client-server architecture are disclosed. A primary media device may be configured to operate as a server in a local network, receive audio/video (A/V) content via an Internet connection and/or a satellite network connection, serve the A/V content to a set of one or more secondary media devices for display with at least one television of a set of one or more televisions, and receive a set of one or more software updates via the Internet connection, a Universal Serial Bus (USB) connection, and/or the satellite network connection. One or more software updates of the set of one or more software updates may be specified for, and may be transferred to, the set of one or more secondary media devices.

19 Claims, 6 Drawing Sheets

(51) Int. Cl.

| | | |
|---|---|---|
| *G06F 8/70* | (2018.01) | |
| *G06F 9/44* | (2018.01) | |
| *G06F 9/451* | (2018.01) | |
| *G10L 15/22* | (2006.01) | |
| *H04B 7/185* | (2006.01) | |
| *H04L 41/0893* | (2022.01) | |
| *H04L 61/5014* | (2022.01) | |
| *H04L 65/611* | (2022.01) | |
| *H04N 21/238* | (2011.01) | |
| *H04N 21/262* | (2011.01) | |
| *H04N 21/2665* | (2011.01) | |
| *H04N 21/4363* | (2011.01) | |
| *H04N 21/45* | (2011.01) | |
| *H04N 21/462* | (2011.01) | |
| *H04N 21/475* | (2011.01) | |
| *H04N 21/478* | (2011.01) | |
| *H04N 21/61* | (2011.01) | |
| *H04N 21/81* | (2011.01) | |
| *G06F 9/445* | (2018.01) | |
| *H04L 101/668* | (2022.01) | |

(52) U.S. Cl.
CPC .................. *G06F 8/70* (2013.01); *G06F 9/44* (2013.01); *G06F 9/451* (2018.02); *G10L 15/22* (2013.01); *H04B 7/18523* (2013.01); *H04L 41/0893* (2013.01); *H04L 61/5014* (2022.05); *H04L 65/611* (2022.05); *H04N 21/238* (2013.01); *H04N 21/26291* (2013.01); *H04N 21/2665* (2013.01); *H04N 21/43637* (2013.01); *H04N 21/4516* (2013.01); *H04N 21/4518* (2020.08); *H04N 21/4622* (2013.01); *H04N 21/475* (2013.01); *H04N 21/478* (2013.01); *H04N 21/6106* (2013.01); *H04N 21/6118* (2013.01); *H04N 21/6125* (2013.01); *H04N 21/6143* (2013.01); *H04N 21/818* (2013.01); *G06F 9/44521* (2013.01); *G10L 2015/223* (2013.01); *H04L 2101/668* (2022.05)

(58) Field of Classification Search
CPC ......... H04N 21/43637; H04N 21/4516; H04N 21/4622; H04N 21/475; H04N 21/478; H04N 21/6106; H04N 21/6118; H04N 21/6125; H04N 21/6143; H04N 21/818; G06F 9/451; G06F 9/44; G06F 8/45; G06F 8/451; G06F 8/453; G06F 8/65; G06F 8/70; H04L 61/5014; H04L 65/611; H04L 41/0893; H04B 7/1852
See application file for complete search history.

(56) References Cited

U.S. PATENT DOCUMENTS

| | | |
|---|---|---|
| 10,091,065 B1 | 10/2018 | Gast et al. |
| 10,349,059 B1 | 7/2019 | Good |
| 11,122,325 B1 | 9/2021 | Gupta et al. |
| 11,184,660 B1 | 11/2021 | Ewanchuk et al. |
| 11,227,620 B2 | 1/2022 | Igarashi |
| 11,330,335 B1 | 5/2022 | Loritsch et al. |
| 2006/0200849 A1 | 9/2006 | Sundarrajan et al. |
| 2007/0174635 A1* | 7/2007 | Jones .................... G06F 21/125 |
| | | 713/189 |
| 2009/0254639 A1 | 10/2009 | Manchester et al. |
| 2009/0316706 A1 | 12/2009 | Hawley et al. |
| 2010/0037271 A1 | 2/2010 | Crowe |
| 2011/0158149 A1 | 6/2011 | Mugulavalli et al. |
| 2012/0019732 A1 | 1/2012 | Lee et al. |
| 2012/0173746 A1 | 7/2012 | Salinger et al. |
| 2013/0031592 A1 | 1/2013 | Choi et al. |
| 2013/0129324 A1 | 5/2013 | Uro et al. |
| 2013/0185761 A1* | 7/2013 | Friel ...................... H04B 17/20 |
| | | 725/139 |
| 2013/0223441 A1 | 8/2013 | Meyer et al. |
| 2014/0075467 A1* | 3/2014 | Chritudass ......... H04N 21/4586 |
| | | 725/110 |
| 2014/0153489 A1 | 6/2014 | Perras et al. |
| 2014/0227976 A1* | 8/2014 | Callaghan ........... H04L 12/1859 |
| | | 455/41.2 |
| 2015/0074735 A1 | 3/2015 | Herigstad et al. |
| 2015/0326921 A1 | 11/2015 | Makovetsky et al. |
| 2017/0019372 A1 | 1/2017 | Panje |
| 2017/0026712 A1 | 1/2017 | Gonder et al. |
| 2017/0155580 A1 | 6/2017 | Ramanujan et al. |
| 2017/0180790 A1* | 6/2017 | Howard ................ H04L 67/568 |
| 2017/0251026 A1 | 8/2017 | Straub et al. |
| 2017/0331885 A1 | 11/2017 | Jakatdar et al. |
| 2018/0070129 A1 | 3/2018 | Cholas et al. |
| 2018/0146113 A1 | 5/2018 | Takahashi |
| 2018/0176101 A1 | 6/2018 | Stephenson et al. |
| 2019/0090154 A1 | 3/2019 | Olderdissen et al. |
| 2019/0166387 A1 | 5/2019 | Perez |
| 2020/0005735 A1 | 1/2020 | Kim et al. |
| 2020/0379747 A1* | 12/2020 | Kaartinen ................. G06F 8/65 |
| 2021/0051091 A1 | 2/2021 | Joseph et al. |
| 2021/0127168 A1 | 4/2021 | Perez |
| 2021/0219017 A1* | 7/2021 | Pattison ............... H04N 21/443 |
| 2021/0241764 A1 | 8/2021 | Shin |
| 2021/0385550 A1 | 12/2021 | Jothilingam et al. |
| 2022/0337745 A1 | 10/2022 | Gu et al. |
| 2022/0385988 A1 | 12/2022 | DiNatale et al. |
| 2023/0052067 A1 | 2/2023 | Chu et al. |

OTHER PUBLICATIONS

DISH Network Hopper 3 Demo by SilverStar Satellite—YouTube, Published Feb. 9, 2016, 3 pages.

* cited by examiner

UPDATING MEDIA DEVICES IN A LOCAL NETWORK WITH A CLIENT-SERVER ARCHITECTURE

CROSS-REFERENCE TO RELATED APPLICATION

This application is a non-provisional of and claims the benefit of the filing date of U.S. Provisional Application No. 63/232,552, filed on Aug. 12, 2021, which is incorporated herein by reference in its entirety for all purposes.

TECHNICAL FIELD

This disclosure generally relates to techniques of facilitating smart TV content receivers, and more particularly to systems and methods for updating media devices in a local network with a client-server architecture.

BACKGROUND

Television content receivers may be configured to receive and distribute digital content from a remote content provider within a local network of television content receivers. Smart television operating systems may provide users access to digital content from additional content providers as well as other computing functionalities, such as voice assistants and smart home integrations. As smart devices, digital content providers, and smart televisions become more ubiquitous, integration of smart television functionalities into local network connected television content receivers is needed. Integrating smart television functionalities into local network connected television content receivers may improve user satisfaction and reduce technological complexities.

Thus, there is a need for systems, methods, and processor-readable media that address the foregoing problems. This and other needs are addressed by the present disclosure.

BRIEF SUMMARY

Certain embodiments of the present disclosure relate generally to facilitating smart TV content receivers, and more particularly to systems and methods for updating media devices in a local network with a client-server architecture.

In one aspect, a system to facilitate updating media devices in a local network with a client-server architecture is disclosed. The system may include a primary media device that may be configured to: operate as a server in a local network; receive audio/video (A/V) content via an Internet connection and/or a satellite network connection; serve the A/V content to a set of one or more secondary media devices for display with at least one television of a set of one or more televisions; receive a set of one or more software updates via the Internet connection, a Universal Serial Bus (USB) connection, and/or the satellite network connection, where one or more software updates of the set of one or more software updates are specified for the set of one or more secondary media devices; and transfer, to the set of one or more secondary media devices, the one or more software updates of the set of one or more software updates that are specified for the set of one or more secondary media devices. The system may include communicatively connected to the primary media device. Each secondary media device of the set of one or more secondary media devices may be configured to: operate as a client with respect to the primary media device in the local network; receive, from the primary media device, the one or more software updates of the set of one or more software updates that are specified for the set of one or more secondary media devices; and install the one or more software updates.

In another aspect, a method to facilitate updating media devices in a local network with a client-server architecture is disclosed. The method may include one or a combination of the following. A primary media device may be configured to: operate as a server in a local network; receive audio/video (A/V) content via an Internet connection and/or a satellite network connection; serve the A/V content to a set of one or more secondary media devices for display with at least one television of a set of one or more televisions; receive a set of one or more software updates via the Internet connection, a USB connection, and/or the satellite network connection, where one or more software updates of the set of one or more software updates are specified for the set of one or more secondary media devices; and transfer, to the set of one or more secondary media devices, the one or more software updates of the set of one or more software updates that are specified for the set of one or more secondary media devices. The set of one or more secondary media devices may be configured to: operate as a client with respect to the primary media device in the local network; receive, from the primary media device, the one or more software updates of the set of one or more software updates that are specified for the set of one or more secondary media devices; and install the one or more software updates.

In yet another aspect, one or more machine-readable storage devices for storing machine-executable instructions are disclosed. The machine-executable instructions, when executed by one or more processing devices, cause the one or more processing devices to: operate as a server in a local network; receive audio/video (A/V) content via an Internet connection and/or a satellite network connection; serve the A/V content to a set of one or more secondary media devices for display with at least one television of a set of one or more televisions; receive a set of one or more software updates via the Internet connection, a USB connection, and/or the satellite network connection, where one or more software updates of the set of one or more software updates are specified for the set of one or more secondary media devices; and transfer, to the set of one or more secondary media devices, the one or more software updates of the set of one or more software updates that are specified for the set of one or more secondary media devices. The set of one or more secondary media devices may: operate as a client with respect to the primary media device in the local network; receive, from the primary media device, the one or more software updates of the set of one or more software updates that are specified for the set of one or more secondary media devices; and install the one or more software updates.

In various embodiments, the primary media device and/or the one or more processing devices may receive the set of one or more software updates from a server system that is remote from the primary media device and/or the one or more processing devices. In various embodiments, the primary media device and/or the one or more processing devices may receive a targeting file that specifies targeting information, where the targeting information may include specifications of the set of one or more software updates. In various embodiments, the primary media device and/or the one or more processing devices may identify at least part of the set of one or more software updates based at least in part on the targeting file. In various embodiments, the primary media device and/or the one or more processing devices may pull the one or more software of the set of software updates from a server system that is remote from the primary media device and/or the one or more processing devices on behalf of the set of one or more secondary media devices. In various embodiments, at least one second media device of the set of one or more secondary media devices may identify the one or more software updates of the set of one or more software updates based at least in part on the targeting file and may request the one or more software updates from the primary media device and/or the one or more processing devices. In various embodiments, the primary media devices and/or the one or more processing devices may identify the one or more software updates of the set of one or more software updates based at least in part on the targeting file.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure relates in general to television devices, and, more specifically, but not by way of limitation, to systems and methods for facilitating smart TV content receivers in a local network.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
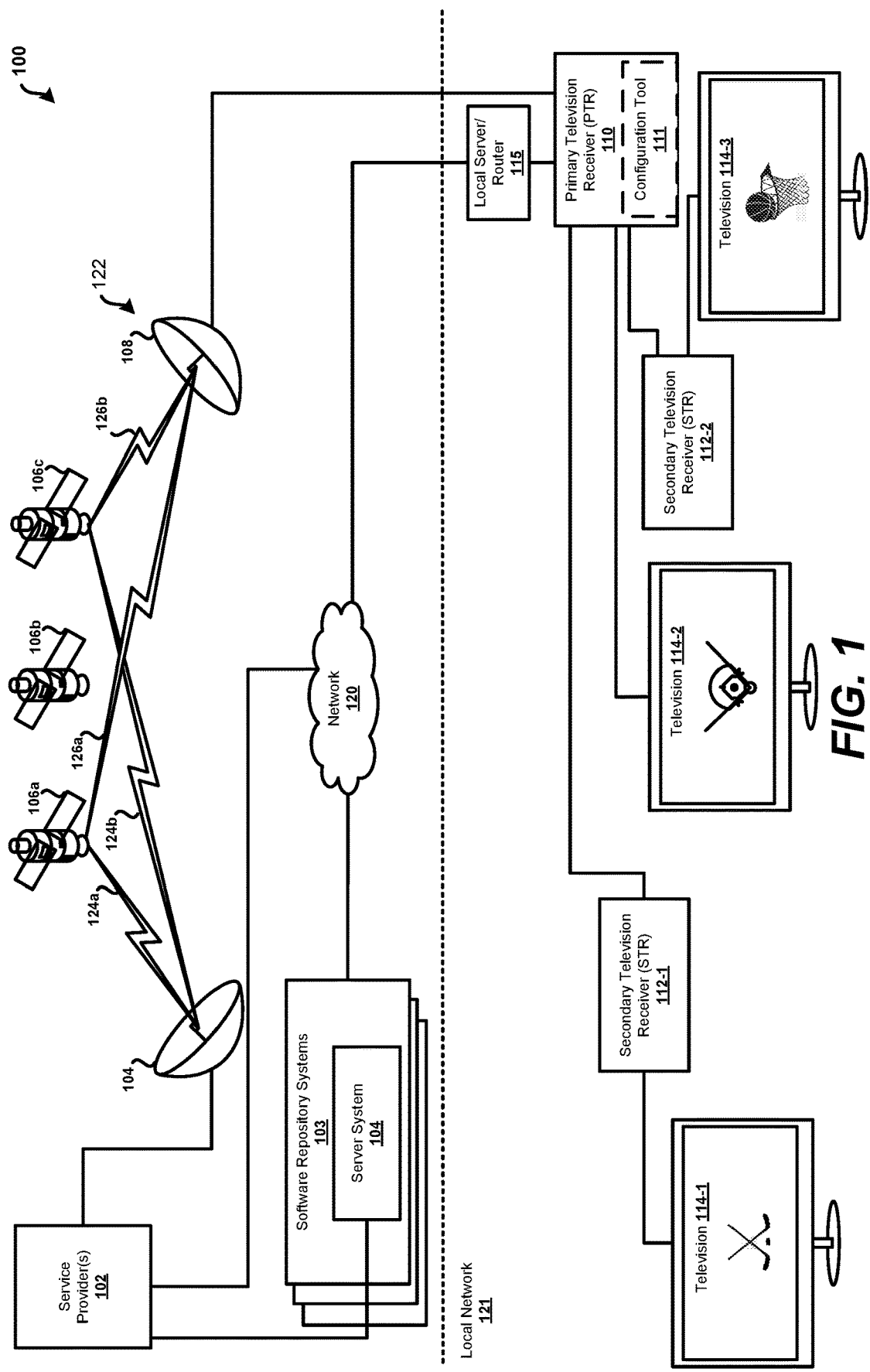
FIG. 1 illustrates an exemplary media content distribution system in accordance with embodiments according to the present disclosure.

FIG. 1 shows an exemplary media content distribution system 100 in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The system 100 may include a service provider 102, a satellite network 122 (which may include a satellite uplink 104, a plurality of satellites 106a-c, a satellite dish 108, etc.), a primary television receiver (PTR) 110, a plurality of secondary television receivers (STRs) 112, a plurality of televisions 114, remote control devices 118, a local server 115 (e.g., a home router) and at least one software repository system 103. As disclosed herein, the PTR 110 and STRs 112 may correspond to smart TV content receivers. The televisions 114 may correspond to smart TVs.

The system 100 may also include at least one network 120 that may facilitate bi-directional communications for data transfer between the PTR 110, the service provider 102, and the software repository system 103, which communications may be by way of the local server 115 and/or the satellite components. The network 120 is intended to represent any number of terrestrial and/or non-terrestrial network features or elements. For example, the network 120 may incorporate or exhibit any number of features or elements of various wireless and/or hardwired packet-based communication networks such as, for example, a wide area network (WAN), a home area network (HAN), a local area network (LAN), a wireless-local area network (W-LAN), Internet, a cellular network, or any other type of communication network configured such that data may be transferred between and among respective elements of the system 100.

The system 100 may also include at least one local network 121 that establishes a bi-directional communication path for data transfer between and among the PTR 110, STRs 112, and televisions 114 of the system 100, which may be by way of the local server 115. The local network 121 may correspond to a home computing environment. The PTR 110, together with the STRs 112 and televisions 114, may each be incorporated within or form at least a portion of a particular home computing network 121.

The PTR 110 and the STRs 112 as described throughout may correspond to television receivers, television converters, etc., such as a set-top box (STB) for example, configured as smart TV content receivers. In another example, the PTR 110 and the STRs 112, may exhibit functionality integrated as part of or into a television, a digital video recorder (DVR), a computer such as a tablet computing device, or any other computing system or device, as well as variations thereof. Further, the PTR 110 may be configured so as to enable communications in accordance with any particular communication protocol(s) and/or standard(s) including, for example, transmission control protocol (TCP)/Internet protocol (IP), digital living network alliance/digital transmission copy protection over Internet Protocol), high-definition multimedia interface/high-bandwidth digital content protection, etc. For instance, one or more of the various elements or components of the local network 121 may be configured to communicate in accordance with the MoCA® (Multimedia over Coax Alliance) home entertainment networking standard.

According to some embodiments, the PTR 110 and the STRs 112 may be configured in a client-server architecture within the local network 121. Each STR 112 may operate and stream A/V content without communicating directly to a cloud server (e.g., without communicating to a remote system via the network 120). Each STR 112 may obtain the majority or all of its content from a PTR 110 with which the STR 112 is communicatively coupled (e.g., via one or a combination of MoCA, Wi-Fi, and/or the like) in the local computing network 121.

The one or more software repository systems 103 may include a server system 104 associated with the service provider system 102. The specialized was there about that different software files system of systems server system 104 may include one or more servers configured to facilitate software updates to the local network 121 by way of the PTR 110 as disclosed further herein. The server system 104 may be configured to provide a pseudo-play store and/or pseudo-app store to provide software to the PTR 110, and, from the PTR 110 to the STRs 112. The server system 104 may provide software for the PTR 110 and/or STRs 112 that may include system applications and corresponding updates for the PTR 110 and/or STRs 112, and over the air (OTA) applications and corresponding updates for the PTR 110 and/or STRs 112. Such software and updates for the PTR 110 and/or STRs 112 may facilitate the systems, kernel, network device managers, CPU drivers, TV guide, launcher, software updater, player, Android updates (e.g., APK (Android Packaging Kit bundles)), and/or the like. In some embodiments, the software and software updates may also be for and/or otherwise facilitate other client devices (e.g., smart TVs, other end-user computing devices, IOT devices, and/or the like). In various instances, the network 120, the satellite network 122, and/or the configuration tool 111 may be used to transmit the software to the PTR 110. Thus, for example, the satellite network 122 may be used to download software files and store them on the hard drive of PTR 110. The satellite software downloads may be spooled on separate PIDs.

The software and updates provided by the server system 104 may be packaged per a third-party requirement (e.g., a Google® requirement for Android updates). The server system 104 may encrypt the software and updates with a proprietary encryption scheme and uniquely signs the corresponding file. When the PTR 110 receives the signed and encrypted file, the PTR 110 may perform unique signature checking on the signed and encrypted file downloaded to ensure that the file is valid and authenticated. The PTR 110 before the signature checking on behalf of all STRs 112 in the local system 121. Consequently, one or more STRs 112 may receive the checked and encrypted file from the PTR 110. In some examples, this may include each STR 112 obtaining OTA updates, system updates, smart TV OS-specific file format packages, APK bundles, software for third-party apps, and/or the like from the PTR 110. The STR 112 may check the signature on the encrypted file received from the PTR 110, may decrypt the file, and then may use it to update its software and/or the software of one or more client devices (e.g., client devices 214 disclosed further herein).

Additionally, the PTR 110 may facilitate other types of applications and updates that may correspond to third-party apps. In some embodiments, the one or more software repository systems 103 may include one or more systems that provide such software and may correspond to Google® play store and/or the like. In such cases, the PTR 110 may pull the software from such a system on behalf of itself and/or one or more of the STRs 112 and/or other client devices. To do so, the PTR 112 may utilize the network 120 (e.g., the Internet). When a STR 112 received the software from the PTR 110, the STR 112 may, in some embodiments, decrypt the file, plug-in, and/or other code corresponding to the software, and then may use it to update its software and/or the software of one or more client devices.

In some embodiments, the PTR 110 may include, have installed thereon, be connected to, or otherwise be communicatively coupled to a PTR configuration tool 111. The PTR configuration tool 111 may adapt (e.g., with low-level software and, in some embodiments, hardware) the PTR 110 currently deployed in a home computing environment to operate in accordance with various embodiments disclosed herein. In some embodiments, the PTR configuration tool 111 may correspond to an add-on device that configures the PTR 110 with the software components, and in some embodiments provides the necessary hardware components, to enable the PTR 110 to provide, among other things, the control and networking features to the local network 121, obtain over-the-top (OTT) services and stream to STRs 112, communicate with STRs 112, operate as a server in the client-server architecture to provide the various features to the STRs 112, utilize link-local IP addresses to provide the various features, obtain and provide the software update features to the STRs 112, and/or the like features disclosed herein.

In some embodiments, the PTR configuration tool 111 may correspond to a dongle that may be connected to a port of the PTR 110. For example, the PTR configuration tool 111 may be connected by way of a USB connection, USB-C connection, SD card connection, Bluetooth connection, NFC connection, and/or the like of the PTR 110. Accordingly, the PTR configuration tool 111 may allow for quick adaptation of a PTR 110 without the need for individualized integration, for example, without individualized Linux integration. It is appreciated that the description of the PTRs 111 provided above is in no way limiting the scope of the present disclosure. Rather, other embodiments are possible, where pre-configured PTRs 110 may be initially configured with low-level software and hardware to perform the functionalities disclosed herein.

In practice, the satellites 106a-c may each be configured to receive uplink signals (e.g., 124a, 124b, etc.) from the satellite uplink 104. In this example, each of the uplink signals may contain one or more transponder streams of particular data or content, such as one or more particular television channels, as supplied by the service provider 102. For example, each of the respective uplink signals may contain various media content such as encoded High-Definition television channels, Standard Definition television channels, on-demand programming, programming information, and/or any other content in the form of at least one transponder stream, and in accordance with an allotted carrier frequency and bandwidth. In this example, different media content may be carried using different ones of the satellites 106a-c.

The satellites 106a-c may further be configured to relay the uplink signals (i.e., 124a, 124b) to the satellite dish 108 as downlink signals (represented as 126a, 126b). Similar to the uplink signals, each of the downlink signals may contain one or more transponder streams of particular data or content, such as various encoded and/or at least partially electronically scrambled television channels, on-demand programming, etc., in accordance with an allotted carrier frequency and bandwidth. The downlink signals, however, may not necessarily contain the same or similar content as a corresponding one of the uplink signals. This may occur due to different user subscriptions. For example, the uplink signal 124a may include a first transponder stream containing at least a first group or grouping of television channels, and the downlink signal 126a may include a second transponder stream containing at least a second, different group or grouping of television channels. In other examples, the first and second group of television channels may have one or more television channels in common. In other words, there may be varying degrees of correlation between the uplink signals and the downlink signals, both in terms of content and underlying characteristics. Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers (e.g., HBO®, CBS®, ESPN®, etc.).

The satellite dish 108 may be provided for use to receive television channels (e.g., on a subscription basis) provided by the service provider 102, satellite uplink 104, and/or satellites 106a-c. For example, the satellite dish 108 may be configured to receive particular transponder streams, or downlink signals e.g., 126a or 126b, from one or more of the satellites 106a-c. Additionally, the PTR 110, which is communicatively coupled to the satellite dish 108, may subsequently select via tuner, decode, and relay particular transponder streams to a television 114-2 for display thereon. For example, the satellite dish 108 and the PTR 110 may, respectively, be configured to receive, decode, and relay at least one premium HD-formatted television channel to the television 114-2. Programming or content associated with the HD channel may generally be presented live, or from a recording as previously stored on, by, or at the PTR 110. Here, the HD channel may be output to the television 114-1 in accordance with the HDMI/HDCP content protection technologies. Other embodiments are however possible. For example, the HD channel may be output to the television 114-1 in accordance with the MoCA® home entertainment networking standard.

Further, the PTR 110 may select via tuner, decode, and relay particular transponder streams to one or both of the STRs 112, which may in turn relay particular transponder streams to a corresponding one of the televisions 114 for display thereon. For example, the satellite dish 108 and the PTR 110 may, respectively, be configured to receive, decode, and relay at least one television channel to the television 114-1 by way of the STR 112-1. It is appreciated that the television channel may be presented live or from a recording as previously stored on the PTR 110, and may be output to the television 114-1 by way of the STR 112-1 in accordance with a particular content protection technology and/or networking standard.

Figure 2:
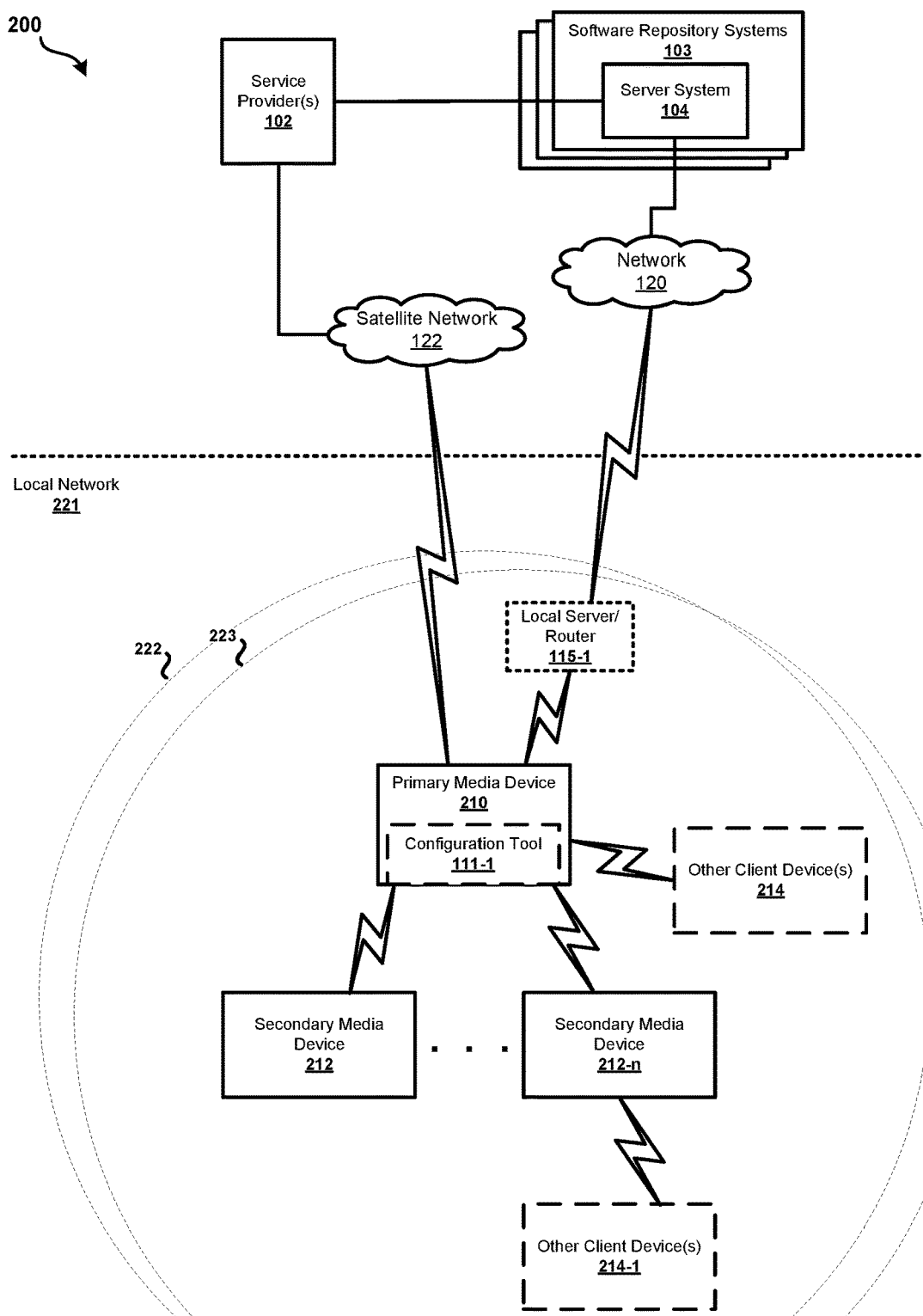
FIG. 2 illustrates an example block diagram of a client-server A/V streaming architecture that is configured to update media devices over a local network via a primary media device, in accordance with embodiments according to the present disclosure.

FIG. 2 illustrates an example block diagram of a client-server A/V streaming architecture 200 that is configured to update media devices over a local network 221 via a primary media device 210, in accordance with disclosed embodiments according to the present disclosure. The general environment of the client-server A/V streaming architecture 200 may correspond to client-server A/V streaming over the local network 221, where the local network 221 may, for example, correspond to a home network 121. The local network 221 may include a primary media device 210 and one or more secondary media devices 212.

In some embodiments, the primary media device 210 may include the PTR 110 and each secondary media device 212 may include the STR 112; however, in some embodiments, the primary media device 210 and the one or more secondary media devices 212 may include other types of content receivers. In some embodiments, the primary media device 210 and the one or more secondary media devices 212 may include one or a combination of various computerized devices configured to facilitate features disclosed in various embodiments herein. For example, in various embodiments, the primary media device 210 and the one or more secondary media devices 212 may include one or more of a laptop computer, a desktop computer, a home server, a home router, a smart TV, a smartphone, a tablet computer, another mobile device, smart glasses, a smart watch, another form of wearable computing device, and/or the like. In some embodiments, the primary media device 210 and the one or more secondary media devices 212 may serve content to and/or include one or more display devices, such as a televisions 114 and/or integrated display devices. In some embodiments, the primary media device 210 and/or the one or more secondary media devices 212 may serve one or more other client devices 214, which may, for example, include one or a combination of the televisions 114 and/or the other abovementioned devices.

In a conventional client-server architecture, devices of a local network may need to connect to the Internet for enhanced functionality through a home router. To connect with the router, the devices may get an IP address from the home router. However, there are issues with such a situation that are resolved by embodiments disclosed herein. For example, there may be no Internet connection for any of a number of different reasons. However, a secondary media device 212 video streaming encrypted A/V from a primary media deice 210 may need to be supported (e.g., with software and updates from the server system 104 and/or other one or more software repository systems 103) even when there is no Internet connection. An IP address may be still needed. Disclosed embodiments may provide solutions for such issues that include providing for an IP address that may be a link-local IP address (also known as zero-conf or zero-configuration networking). As disclosed herein, the devices of the client-server A/V streaming architecture 200 may be configured to communicate with each other and perform video streaming using link-local IP addresses, which, because they are self-assigned, provide for more stable AV streaming.

Another issue that is solved by disclosed embodiments involves IP addresses that change or are lost. With a router connection to the Internet, there is a DHCP (Dynamic Host Configuration Protocol) Server which assigns a routable IP address, called a DHCP address. The DHCP Server assigns IP addresses to individual hosts in the network upon host request. However, the IP addresses may change and may be lost from the perspective of the individual devices, especially with some problematic DHCP servers running in the hundreds of different router models. Disclosed embodiments may also provide solutions for such issues, as disclosed herein.

Other issues that are resolved by disclosed embodiments include the following. The IP addresses supported by some routers in some home networks can be limited such that they are insufficient to support all the devices on the network. Also, routers can enter a bad state such that cannot adequately provide for A/V streaming via IP. Additionally, conventional smart TV and associated apps do not support solutions where no Wi-Fi is available; conventional designs assume Wi-Fi is available. However, disclosed embodiments may provide solid, reliable A/V services to the primary media devices 210 and the secondary media devices 212, despite the above problems.

The client-server A/V streaming architecture 200 may correspond to a multiple-subnet architecture. In the local network 221, the primary media device 210 and/or the one or more secondary media devices 212 may be configured to establish and use multiple subnets 222 and 223 over the same physical network connection(s). As disclosed herein, in some embodiments, the primary media device 210 may be configured to perform its operations as further detailed herein by way of the configuration tool 111-1. A dual-subnet architecture 200 may, for example, include a link-local IP subnet (also known as, zero-configuration) 222 and a Dynamic Host Configuration Protocol (DHCP) IP subnet 223. Typically, DHCP IP addressing may be mainly used for Internet access and for communication with other home network devices. DHCP IP addressing may be available when the local network 221 includes a DHCP server 115-1 (e.g., a home router 115-1). Each device may obtain its own DHCP IP address from the DHCP server 115-1. In some embodiments, the secondary media device 212 and/or other client device 214 may object their respective DHCP IP addresses from the DHCP server 115-1 through the primary media device 210; in some embodiments, the secondary media device 212 and/or other client device 214 may object their respective DHCP IP addresses directly from the DHCP server 115-1.

In the local network 221, in addition to creating, establishing, expanding, and/or using the DHCP IP subnet 223, the primary media device 210 and/or the one or more secondary media devices 212 may further create and use the link-local IP subnet 222. Within a typical home network, it may be that not all devices support both subnets. A DHCP IP subnet may be supported but not necessarily both a DHCP IP subnet and a link-local IP subnet. However, the primary media devices 210 and the secondary media devices 212 may support multiple subnets, including both a DHCP IP subnet 223 and a link-local IP subnet 222.

The primary media device 210 and/or the one or more secondary media devices 212 may self-assign link-local IP addresses to create the subnet 222. The primary media device 210 and the one or more secondary media devices 212 may each self-assign link-local IP addresses upon startup, and/or after network connection interruption and subsequent reestablishment. In some instances, other devices 214 in the local network 221, which may include third-party devices, may also generate their own link-local IP addresses. The architecture 200 may support multiple platforms, including Linux, Android, and/or the like.

The devices 210, 212, and/or 214 may be configured to communicate with each other and perform video streaming using link-local IP addresses, which, because they are self-assigned, provide for more stable A/V streaming. The primary media device 210 and/or the one or more secondary media devices 212 may, for example, use the link-local IP subnet architecture 200 for A/V streaming, command and control, and other client-service device communications as a default. Likewise, the primary media device 210 may obtain software and updates from the server system 104 and/or other one or more software repository systems 103 on behalf of the one or more secondary media devices 212 and/or one or more client devices 214 and may distribute the software and updates to the one or more secondary media devices 212 and/or one or more client devices 214.

Figure 3:
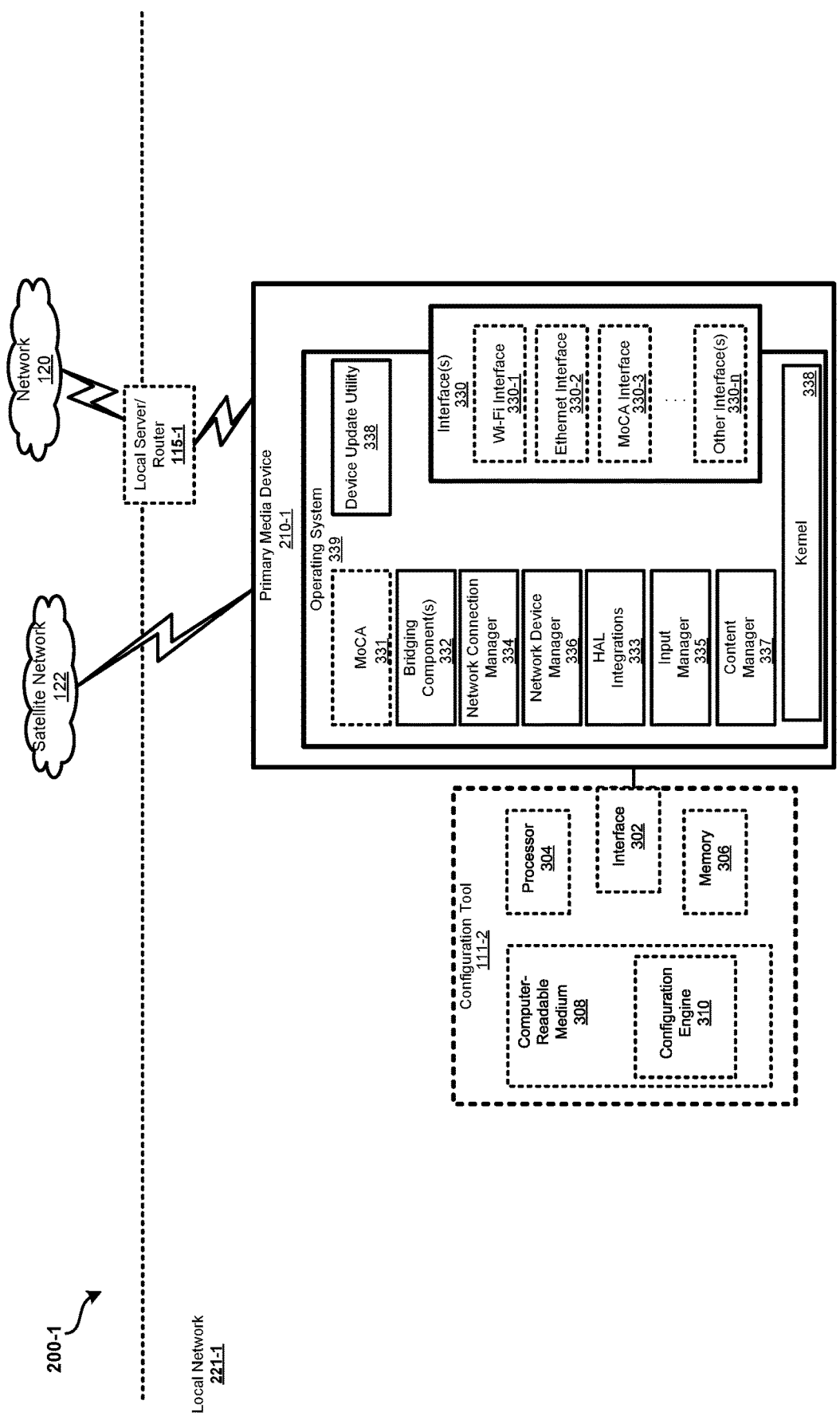
FIG. 3 further illustrates an example block diagram of a primary media device of the client-server A/V streaming architecture, in accordance with embodiments according to the present disclosure.
Figure 4:
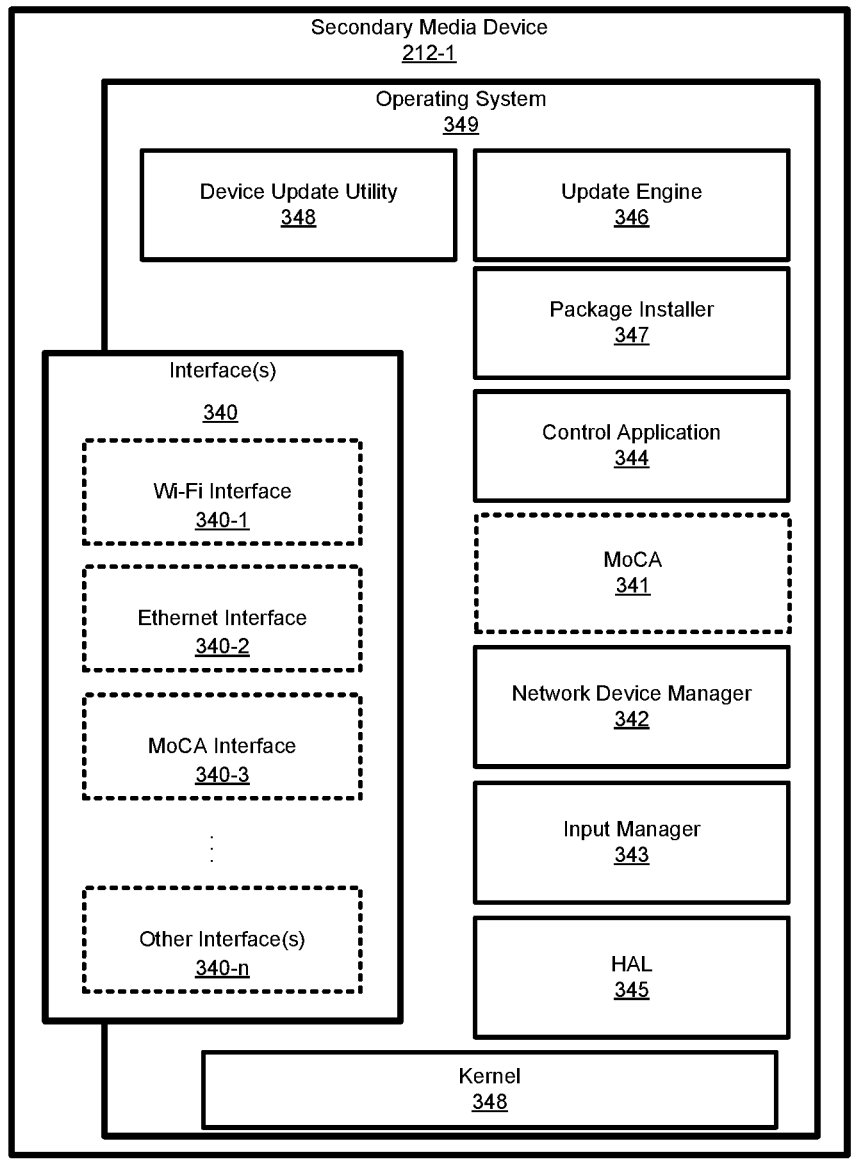
FIG. 4 further illustrates an example block diagram of a secondary media device of the client-server A/V streaming architecture, in accordance with embodiments according to the present disclosure.

FIG. 3 illustrates an example block diagram of a primary media device 210-1 of the client-server A/V streaming architecture 200, in accordance with disclosed embodiments according to the present disclosure. FIG. 4 illustrates an example block diagram of a secondary media device 212-1 of the client-server A/V streaming architecture 200, in accordance with disclosed embodiments according to the present disclosure. For brevity, the primary media device 210-1, the configuration tool 111-2, and the secondary media device 212-1 are depicted in a simplified form, and various embodiments of the primary media device 210-1, the configuration tool 111-2, and the secondary media device 212-1 may generally include more and/or different components to implementing various features of the embodiments.

The network 120 may provide a connection between the one or more software repository systems 103 (which may include the server system 104) and the primary media device 210-1. The network 120 may provide a connection between the service provider system 102 and the primary media device 210-1. Additionally or alternatively, the primary media device 210-1 may be connected to the service provider system 102 via a satellite network 122 connection. For example, as described above, the primary media device 210-1 may be coupled with a satellite antenna configured to receive data from one or more satellites. The service provider system 102 may include one or more remote services configured to provide digital content such as live television channels, subscription television shows, streaming movies, streaming audio, shopping, etc. to a requesting device, such as the primary media device 210-1. The service providers 102 may distribute digital content via network 120, such as the Internet. Additionally, or alternatively, service providers 102 may distribute digital content via direct broadcast satellite services.

In some embodiments, the primary media device 210-1 may be part of multiple different networks. For example, the primary media device 210-1 may communicate with service provider systems 102 via the Internet. Additionally or alternatively, the primary media device 210-1 may communicate with the secondary media device 212-1 via the local network 121, 221. In some embodiments, the primary media device 210-1 has a direct connection to the network 120 while the secondary media device 212-1 does not have a direct connection to the network 120. For example, the secondary media device 212-1 may route some or all communication to the network 120 and/or the satellite network 122 via the primary media device 210-1. Incoming communications from the network 120 and/or the satellite network 122 may also be received by the primary media device 210-1 and routed to the secondary media device 212-1. In this way, the secondary media device 212-1 may still receive and consume services from service providers 102 without having a direct connection with the network 120. This may include the primary media device 210-1 and the secondary media device 212-1 providing the ability to play encrypted A/V without an Internet connection on an Android TV.

In embodiments that include the configuration tool 111-2, the configuration tool 111-2 may be a portable device suitable for easy installation with respect to the primary media device 210-1 as an add-on device that transforms the primary media device 210-1 to operate in accordance with various embodiments disclosed herein. In some embodiments, the configuration tool 111-2 may correspond to a dongle that may be connected to a port of the primary media device 210-1. The configuration tool 111-2 may include one or more communication modules and interfaces 302 configured for interface with the primary media device 210-1. The communication modules and interfaces 302 may include one or combination of a USB interface, a USB-C interface, an SD card interface, and/or the like. Additionally or alternatively, the communication modules and interfaces 302 may include one or combination of ZigBee, Bluetooth, Z-Wave, Wi-Fi, and/or the like RF communication modules which allow the wireless communication of proximate devices.

The configuration tool 111-2 may include memory 306 communicatively coupled to one or more processors 304 (e.g., a microprocessor) for processing the functions of the configuration tool 111-2. The configuration tool 111-2 may at least one processor-readable/computer-readable medium 308 coupled to the processor 304, which stores executable code, plug-ins, application programs, and/or other computer code instructions for operating the configuration tool 111-2 and using the configuration tool 111-2 to adapt (e.g., with low-level software and, in some embodiments, hardware) the primary media device 210-1 to operate in accordance with various embodiments disclosed herein. The configuration tool 111-2 may include a configuration engine 310 that may be configured to configure the primary media device 210-1. In various embodiments, the configuration engine 310 may be stored in the computer-readable media 308 and/or the memory 306.

When the configuration tool 111-2 is connected to the primary media device 210-1 (e.g., via USB connection, wirelessly, etc.), the configuration tool 111-2 and the primary media device 210-1 may communicate with each other to facilitate low-level discovery of each other. In some embodiments, the primary media device 210-1 may at least partially utilize the discovery process disclosed further herein. For example, some embodiments of the primary media device 210-1 may utilize one or a combination of the features of a network connection manager 334, a network device manager 336, discovery protocols such as UPnP and DNS-SD Device Discovery, and/or the like to facilitate discovery of the configuration tool 111-2. Likewise, some embodiments of the configuration tool 111-2 may include and utilize one or combination of corresponding modules and features to facilitate discovery of the primary media device 210-1.

Once the configuration tool 111-2 and the primary media device 210-1 are discovered, identified, and known to each other, the configuration engine 310 may automatically execute configuration processes with respect to the primary media device 210-1 in some embodiments. The configuration engine 310 may correspond to any suitable executable code, plug-ins, application programs, and/or other software to execute to configure the primary media device 210-1, which may include installing executable code, plug-ins, modules, application programs, and/or other software on the primary media device 210-1. When the configuration tool 111-2 configures the primary media device 210-1, the configuration tool 111-2 may cause the primary media device 210-1 to automatically transition from its original mode of operations to a different mode of operations that facilitate the enhanced features and operations of embodiments disclosed herein. New settings may be created for the new mode of operations. A composite of the and new settings and at least a portion of the previous settings of the primary media device 210-1 may be saved and stored locally by the primary media device 210-1. Additionally, the composite of the settings may be communicated to a backend system (e.g., a service provider system 102) for backup, in order to allow restoration of the primary media device 210-1 with the composite of the settings if need be.

This may allow the primary media device 210-1 to provide, among other things, the client-server features to the local network 121, 221; operate as a server in the client-server architecture to provide the various features to the secondary media devices 212 and corresponding devices 214; utilize link-local IP addresses to provide the various features; extend the ability of the primary media device 210-1 with a content manager 337 to manage, and provide for connection ID management for, device-specific sessions for the secondary media devices 212-1 and new client devices 114, 214 it serves; and/or the like features disclosed herein. The configuration tool 111-2 may, for example, overtake one or more user interfaces of the primary media device 210-1 and extend the functionalities of the primary media device 210-1. This may allow a user who has a smart TV 114, 214 (e.g., an Android TV) communicatively coupled to the primary media device 210-1 directly or indirectly via a secondary media device 212-1 to be able to access all the features of the smart TV 114, 214 (e.g., play store apps, etc.) and also be able to utilize the functionalities of provided by the primary media device 210-1.

As another example, the configuration of the primary media device 210-1 by way of the configuration tool 111-2 may further allow for hardware abstraction layer (HAL) integrations 333 that facilitate the primary media device 210-1 to integrate with voice commands of smart TV devices 114, 214 in the local network 121, 221. The HAL integrations 333 may correspond to low-level software integration to allow communication with Google or other smart TV OS voice commands. In some embodiments, for example, the HAL integrations 333 of the primary may device 210-1 and secondary media device 212-1 frameworks may be configured in conjunction with Zigbee RF4CE components to operate applications disclosed herein. For example, a network device manager (NDM) 342 of the secondary media device 212-1, which may be configured to discover the primary media devices 210-1 and secondary media devices 212-1 on the network through a network interface of the secondary media device 212-1, may use an audio HAL integration component.

As another example, an input manager 343 of the secondary media device 212-1, which may be configured to facilitate communication with the remote control 118, may use an audio HAL integration component 345. Likewise, the primary media device 210-1, by way of the configuration tool 111-2, may include an audio HAL integration component 333 to receive and process voice data at the primary media device 210-1 through an input manager 335 of the primary media device 210-1, inject the voice data or corresponding commands to the HAL and smart TV framework so it is available for the voice assistant of the smart TV device 114, 214 (e.g., Google assistant or the like). With the primary media device 210-1 configured with the configuration tool 111-2, the primary media device 210-1 may be able to reuse the same remote control 118 but with extended features such as voice commands which may be received via the remote control 118. Further details regarding the voice integration features facilitated by the configuration tool 111 are disclosed in U.S. patent application Ser. No. 17/556,695, filed Dec. 20, 2021, the entire contents of which are incorporated by reference as if fully set forth herein for all purposes.

With the primary media device 210 configured with the configuration tool 111, the client-server architecture 200 may allow for the primary media device 210-1 and the secondary media device 212-1 to provide a non-pure over-the-top solution, where encrypted A/V and other content may be provided with or without an Internet connection. The primary media device 210-1 may be configured to obtain encrypted A/V and other content via the network 120 (e.g., the Internet) and/or via the satellite network 122 (e.g., from the service provider systems 102).

The primary media device 210 may include a local device update utility 338 configured to allow the primary media device 210 to obtain software and software updates disclosed herein from the server system 104, service provider system 102, and/or one or more other software repository systems 103, on behalf of itself and on behalf of the secondary media devices 212. The secondary media devices 212 may also include a local device update utility 348. The local device update utility 348 may be configured to allow an individual secondary media device 212 to obtain software and software updates from the primary media device 210, with the primary media device 210 operating as a server for the secondary media device 212. For example, the local device update utility 348 may obtain updated application packages (e.g., APK bundles) and system image files from the primary media device 210, decrypt them, and install them in the secondary media device 212 with an update engine 346 and/or package installer 347. The update engine 346 may be configured to handle and manage the system software updates (e.g., system applications and updates). The package installer 347 may be configured to handle and manage the package updates (e.g., APK bundles). In some embodiments, the local device update utility 348 may download from the primary media device 210 and install the software packages in the background using flash partitions.

With multiple secondary media devices 212-1 and/or client devices 114, 214 (e.g., Android TVs), software and updates received by the primary media device 210-1 (e.g., from the server system 104 and/or one or more other service provider systems 103) may be shared by the primary media device 210-1 simultaneously or substantially simultaneously with one or more secondary media devices 212-1 and/or one or more client devices 114, 214.

Additionally or alternatively, one secondary media device 212-1 may be served software/updates via the primary media device 210-1 and the network 120, while another secondary media device 212-1 may be simultaneously or substantially simultaneously served software/updates via the primary device 210-1 and the satellite network 122. Moreover, even on one secondary media device 212-1, a combination of software/updates from different sources (e.g., some obtained via the primary device 210-1 and the Internet, and some obtained via the primary device 210-1 and satellite) may be provided by the primary media device 210-1 and/or the secondary media device 212-1.

In various embodiments, the client-server A/V devices 210-1 may automatically select whether to obtain software/updates via the network 120, via the satellite network 122, and/or via the configuration tool 111 based at least in part on software type, file size, and/or network routing reachability/availability/bandwidth. For example, when the primary media device 210-1, the service provider system 102, and/or the server system 104 detects a performance degradation (e.g., a detected network speed not satisfying a network speed threshold value, a detected download speed not satisfying a download speed threshold value, a detected bandwidth not satisfying a bandwidth threshold value, and/or the like) or outage (e.g., no Internet connection, network components unreachable, and/or the like) in the network 120, the satellite network 122 may be used to transmit software and software updates. Accordingly, the primary media device 210-1 and the secondary media device 212-1 may provide for dynamic switching between the network 120 and/or via the satellite network 122.

In instances where the software is downloaded from the server system 104 via the satellite network 122, the satellite software download process may include one or more of the following operations. The primary media device 210 may obtain a list of all software download PIDs from the connected satellites, which list may be included in the targeting file in some embodiments. The primary media device 210 may check all the PIDs listed. The primary media device 210 may start each PID satellite stream and may download the one or more software files. Such a process may be cycled periodically (e.g., every X minutes) to check back for a new list of software download PIDs and/or new downloads on the PIDs.

In instances where the software is downloaded from the server system 104 via the network 120, the Internet software download process may include one or more of the following operations. The primary media device 210 may obtain a list of all software download packages to download from the server system 104, which list may be included in the targeting file in some embodiments. The primary media device 210 may download each software file, check and correct for redundant filenames, perform checksum verifications on the files, and/or the like disclosed herein until all files specified by the list are downloaded. The targeting filename may be renamed and utilized for the downloaded software files. Old, unused software files not listed may be cleaned up and removed. Such a process may be cycled periodically (e.g., every X minutes) to check back for a new list of software download packages.

In instances where the software is transferred from the configuration tool 111, the software transfer process may include one or more of the following operations. The configuration tool 111 may provide the primary media device 210 with a list of all software download files to download, which list may be included in the targeting file in some embodiments. The primary media device 210 may download each software file, perform checksum/signature verifications on the files, and/or the like disclosed herein until all files specified by the list are downloaded.

In addition to streaming encrypted A/V content from the primary media device 210-1, the secondary media device 212-1 in accordance with disclosed embodiments may be configured to provide one or more smart TV functionalities, such as access to one or more applications, voice assistants, games, and/or other digital content. The smart TV functionalities may be included, and/or accessible through, the operating system 349 installed on the secondary media device 212-1. The operating system 349 may provide a set of processes and a particular inter process communication (IPC) mechanism that enables the processes to communicate and interact with each other.

However, integrating the set of software applications and/or processes configured to obtain the A/V content from the primary media device 210-1 with the smart TV operating system may pose several unique challenges. First, the IPC mechanism provided by the smart TV operating system may not be the same IPC mechanism used by the set of applications configured to obtain the A/V content from the primary television receiver. Further, the smart TV operating system may not include one or more libraries that support the IPC mechanism used by the set of applications. Lastly, the smart TV operating system may not include one or more drivers configured to support the communication between the secondary media device 212-1 and the primary media device 210-1 by which the A/V content is obtained.

Embodiments detailed herein can deal with these challenges and others based at least in part on the software and update distribution with the local device update utilities 338 disclosed herein. A custom software stack within the smart TV operating system can be configured with software and updates to execute in parallel with the native software stack provided by the smart TV operating system. Software applications configured to obtain the A/V content from primary media devices may be facilitated by the local device update utilities 338 and installed in the custom software stack. The modifications may enable the software applications in the custom software stack to interact with processes in the native stack while maintaining their original functionality and portability across multiple platforms. Installing a parallel software stack may reduce the complexity of developing new software applications for the smart TV operating system in addition to creating an environment where other functionalities may be quickly and easily integrated.

The primary media device 210-1 and the secondary media device 212-1 may include operating systems 339, 349 and kernels 338, 348, and may conform to various configurations in accordance with various embodiments. The primary media device 210-1 may include the operating system 339 configured to execute one or more processes. The one or more processes may configure the primary media device 210-1 to receive digital content from service providers 102 and provide the digital content to the secondary media device 212-1 in response to a request received by the primary media device 210-1 from the secondary media device 212-1. For example, the secondary media device 212-1 may be configured to transmit a request to the primary media device 210-1 to tune one or more television frequency tuners of the primary media device 210-1 to a specific frequency associated with a television channel and stream the content received at the specific frequency back to the secondary media device 212-1. The operating system 339 may include one or more drivers configured to control hardware and/or software-based television frequency tuners on-board the primary media device 210-1 and configured to tune to one of a plurality of frequencies corresponding to a plurality of television channels. Additionally, or alternatively, the operating system 339 may include drivers configured to control one or more functions of external devices, such as a satellite antenna, to which the primary media device 210-1 is connected. In some embodiments, the operating system 339 may be a Linux-based operating system that configures the primary media device 210-1 to function as a smart TV content receiver and provider. As another example, the secondary media device 212-1 may be configured to transmit a request to the primary media device 210-1 to provide digital content previously recorded and/or stored by the primary media device 210-1 to the secondary media device 212-1.

The secondary media device 212-1 may include the operating system 349, which may include one or more components configured to manage various hardware and software resource of the secondary media device 212-1. For example, the operating system 349 may include one or more drivers configured to display digital content on a television screen communicatively coupled with the secondary media device 212-1, such as television 114 as described above. In some embodiments, the operating system 349 may be different from the operating system 339 included in the primary media device 210-1. For example, while the primary media device 210-1 may be configured to operate using a Linux-based operating system, the operating system 349 may be a Linux-based operating system that configures the secondary media device 212-1 to function as an Android TV content receiver device.

The kernel 348 may include one or more services at the core of operating system 210. For example, the kernel 348 may facilitate interactions between hardware and software components of the secondary media device 212-1. The kernel 348 may control various hardware resources, such as input and output (I/O) devices, memory, peripherals etc. via device drivers, and optimize utilization of common resources such as a central processing unit (CPU), cache memory, file systems, and network sockets. One or more software stacks can be downloaded and installed on the kernel 348. For example, a native software stack and a custom software stack may each be installed on the kernel 348. The native software stack may include a default software stack for the operating system 349. The custom software stack may be a separate software stack loaded onto the operating system 349. In some embodiments, one or more components of the custom software stack are loaded onto operating system 349 using a custom loader. Further details regarding these embodiments are provided in U.S. patent application Ser. No. 17/556,723, filed Dec. 20, 2021, the entire contents of which are incorporated by reference as if fully set forth herein for all purposes.

In some embodiments, the secondary media device 212-1 and the primary media device 210-1 may be communicatively coupled using one or more coaxial cables. For example, the secondary media device 212-1 and the primary media device 210-1 may include physical connections configured to receive a coaxial cable. Once coupled using coaxial cable, the secondary media device 212-1 and the primary media device 210-1 may utilize the MoCA standards for bi-directional communications between the secondary media device 212-1 and the primary media device 210-1.

In various embodiments, the primary media device 210-1 may include one or more interfaces 330. The one or more interfaces 330 may include a Wi-Fi interface 330-1, an Ethernet interface 330-2, a MoCA interface 330-3, and/or one or more other interfaces. In various embodiments, the secondary media device 212-1 may likewise include one or more interfaces 340. The one or more interfaces 340 may include a Wi-Fi interface 340-1, an Ethernet interface 340-2, a MoCA interface 340-3, and/or one or more other interfaces. Accordingly, the different types of connections may include one or a combination of Wi-Fi connections, Ethernet connections, MoCA connections, USB connections, and/or the like.

In some embodiments, the MoCA interfaces 330-3, 340-3 may correspond to MoCA components 331, 341 that include hardware and software configured to provide non-OTT solutions that enable encrypted content streaming without an Internet connection. The MoCA components 331, 341, for example, may correspond to MoCA applications and interfaces that allow communication of digital packets over a coaxial cable connection between the primary media device 210-1 and the secondary media device 212-1. For instance with respect to the secondary media device 212-1, the MoCA components 341 may include a MoCA driver that may operate like a device driver to allow use of a MoCA connection to communicate with the primary media device 210-1. A control application 344 or another system application of the secondary media device 212-1 may initiate a MoCA that operates with the kernel 348 to set up the interface. To a smart TV device 214, the interface may appear as a simple network interface, without detecting that the interface media is different. Accordingly, MoCA connection quality and consistency may be achieved. Additionally or alternatively, some embodiments may be configured with Wi-Fi radios and software corresponding to the Wi-Fi interfaces 330-1, 340-1 to facilitate a Wi-Fi connection for communications bandwidth the primary media device 210-1 and the secondary media device 212-1. The primary media device 210-1 and the secondary media device 212-1 may be adaptive to utilize one or both of the MoCA connection and the Wi-Fi connection as function of operating conditions in order to maintain encrypted A/V quality above a particular quality threshold without an Internet connection.

To facilitate the concurrent multiple-address configuration utilizing multiple subnets, each active network interface may be assigned IP addresses to provide for coexistent link-local IP addresses and DHCP IP addresses. For example, for each active network interface of the primary media device 210 and/or the one or more secondary media devices 212, a respective link-local IP address may be self-assigned by the respective device 210 or 212 alongside with the DHCP IP address so that each active interface has a link-local IP address and a DHCP IP address in parallel. By way of example, with a MoCA-enabled secondary media device 212-1, link-local IP addresses may be assigned for the MoCA interface 340-3 and the Ethernet interface 340-2. With a Wi-Fi-enabled secondary media device 212-1, link-local IP addresses may be assigned for the Wi-Fi interface 340-1 and the Ethernet interface 340-2. With some configurations of the primary media device 210-1 that utilize the PTR configuration tool 111, there may be a single interface for which a link-local IP address is assigned. Other embodiments are possible.

The primary media device 210-1 may include one or more bridging components 332. The bridging components 332 may correspond to level 2 and/or level 3 bridging components 332. The bridging components 332 may allow for provisioning of an Internet connection, for example, to a smart TV through the primary media device 210-1.

The configured primary media device 210-1 may include a network connection manager 334. In various embodiments, the secondary media device 212-1 may or may not also a network connection manager. The network connection manager 334 may bring up and activate all network interfaces, may detect when an interface is ready for communication (e.g., the low level is active), and may then start an auto IP thread to obtain a link-local IP address. When a link-local IP address is ready to use, the network connection manager 334 may send a notification to a network device manager 336 to start discovery of other nodes in the network 221-1 on the interface.

The configured primary media device 210-1 may include a network device manager 336. In some embodiments, the secondary media device 212-1 may also include a network device manager 342. The network device managers 336, 342 may be configured to use a discovery protocol to discover the devices 210, 212, and/or 214 on the network 221 through the network interfaces 330, 340. The network discovery customization and network device manager communications may provide for how the client-server devices communicate to allow discovery of each other and to identify each other's IP addresses. The configured primary media device 210-1 and the secondary media device 212-1 may discover neighboring devices over both subnets 222, 223 concurrently. As long as a device is reachable via one subnet 222 or 223, it may be discovered. Devices may discover each other via both subnets 222, 223. The device discovery may be deployed through various protocols, such as UPnP and DNS-SD Device Discovery, for example.

The network connection manager 334 may detect on which interface a secondary media device 212-1 is detected (e.g., Wi-Fi interface 340-1, Ethernet interface 340-2, or MoCA interface 340-3). The primary media device 210-1 may authenticate content for streaming to the secondary media device 212-1. Before the secondary media device 212-1 starts using the primary media device 210-1, the primary media device 210-1 may check if the secondary media device 212-1 is authorized on an account associated with the primary media device 210-1 based at least in part on stored account information and/or communications with the service provider system 102.

The network connection manager 334 may set appropriate route rules and advanced route tables to properly route data to corresponding clients. This allows the use of the link-local subnet 222 to support mixed clients (e.g., MoCA-configured secondary media devices 212-1 and Wi-Fi-configured secondary media devices 212-1) in the same local network 221-1 (e.g., a household network).

Once devices are discovered and known to each other, the primary media device 210-1 and/or the secondary media device 212-1 may select the preferred subnet for communication automatically based at least in part on content type and/or network routing reachability. Link-local IP may be selected as preferred if devices discover each other via both subnets 222, 223. For example, client-Server A/V devices 210-1 and/or 212-1 may select the link-local subnet 222 for A/V streaming. The client-server A/V devices 210-1 and/or 212-1 may automatically switch to DHCP IP for A/V streaming when link-local IP is detected as not available, for example, due to third-party rogue network devices 114 and/or 115-1. The DHCP IP subnet 223 may be used to communicate with an Internet server. Accordingly, the primary media device 210-1 and the secondary media device 212-1 may provide for dynamic switching between link-local and DHCP.

However, link-local IP addressing and the link-local subnet 223 may be available at least with respect to the primary media device 210-1 and the secondary media device 212-1 even when no DHCP server 115-1 or home router 115-1 is available, so that client-server software/update distribution can always work. For example, the primary media device 210-1 may communicate software/updates, which it has stored, to the secondary media device 212-1. Additionally or alternatively, the primary media device 210-1 may obtain software/updates via the satellite network 122 and/or configuration tool 111, which software/updates the primary media device 210-1 may then communicate to the secondary media device 212-1.

The devices 210-1, 212-1 may primarily use link-local IP addressing and a link-local subnet 223 to distribute software/updates, not DHCP IP. Link-local may be more stable than DHCP. This may guarantee distribution without disturbance when DHCP IP is not available or fluctuates (e.g., disconnections, the home router 115-1 may enter a bad state, may be old, etc.). The secondary media device 212-1 may always be able to find a primary media device 210-1 on the network 221-1 using the link-local subnet 223. If, for some reason (say, there is a problem on reboot, or some routers 115-1 may be limited such that they do not have enough DHCP addresses to support all the devices to which it should be connected on the local network, or some routers transition to a bad state after running for an extended period of time) the router 115-1 cannot assign a DHCP address, the link-local may be available. Only if link-local communications cannot be established, the DHCP IP address may be used as a fallback for software/updates distribution.

Figure 5:
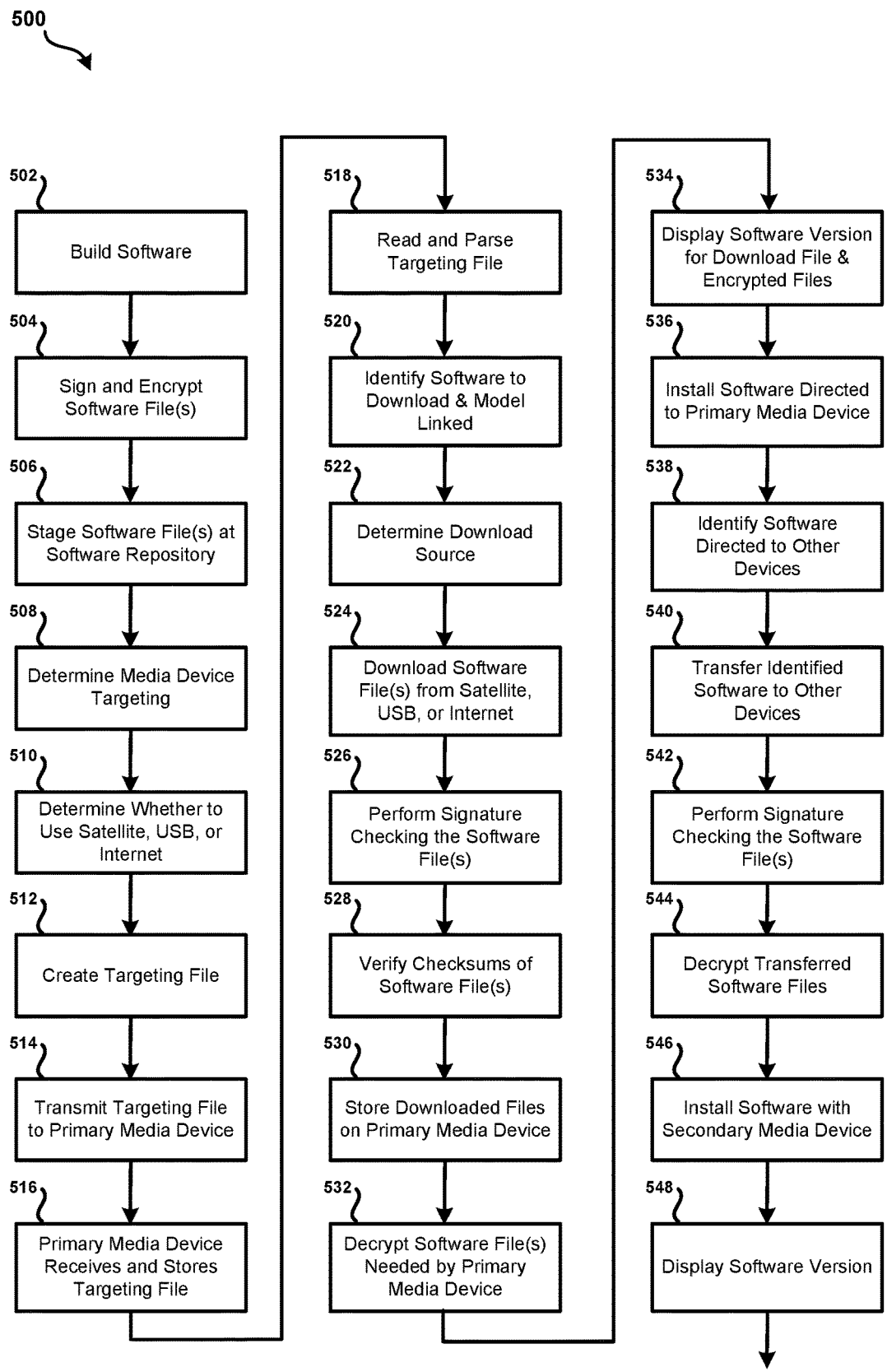
FIG. 5 illustrates an embodiment of a method for certain features directed to updating media devices in a local network with the client-server architecture, in accordance with embodiments according to the present disclosure.

Various methods may be performed with the client-server architecture 200. FIG. 5 illustrates an embodiment of a method 500 for certain features directed to updating media devices in a local network with the client-server architecture 200, in accordance with some example embodiments according to the present disclosure. However, teachings of the present disclosure may be implemented in a variety of configurations. As such, the order of the steps comprising the method 500 and/or other methods, processes, and operations disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 502, the software and/or one or more software updates may be built. The build may be performed by way of the service provider system 102, the server system 104, one or more other software repository systems 103, and/or a build server which may be associated with system one or more of those systems. In some embodiments, this may involve creating an OTA image and/or another form as disclosed herein.

As indicated by block 504, the corresponding one or more software files may be signed and encrypted. In various embodiments, the signing and/or encryption processes may be performed by the service provider system 102, the server system 104, one or more other software repository systems 103, and/or an associated build server. The signing process may include signing with a server key of the server system 104, setting for particular model's download software (e.g., for Android), and/or the like. In some embodiments, as indicated by block 506, the one or more software files may be staged at one or more software repository systems 103 (e.g., the server system 104). In various cases, this may be done before or after the signing and encryption processes.

For example, the server system 104 may perform the signing of an OTA image when it is staged at the server system 104.

As indicated by block 508, media device targeting may be determined. The service provider system 102 may determine the media device targeting in some embodiments. The service provider system 102 may collect and store (e.g., in one or more databases) information about all the media devices 210, 212, and/or 214 in the local networks served by the service provider system 102. Such information may include various types of information that indicate identification of any devices; software installed on the media devices; specifications, states, and versions of the software installed on the media devices; software requests from the media devices; locations of the media devices and local networks; household account information and identifiers; and/or the like. Based at least in part on such information, the service provider system 102 may determine which software is to be installed on which media devices.

As indicated by block 510, it may be determined whether to use the satellite network 122, the network 120, or the configuration tool 111. In various embodiments, the service provider system 102, the server system 104, and/or the primary media device 210 may make the determination. For example, one or a combination of such systems and/or devices may make the determination based at least in part on software type(s) of the one or more software files, file size(s) of the one or more software files, and/or network routing reachability/availability/bandwidth. The determination may be based at least in part on real-time detection of network 120 performance. The primary media device 210-1, the service provider system 102, and/or the server system 104 may detect a performance degradation (e.g., a detected network speed not satisfying a network speed threshold value, a detected download speed not satisfying a download speed threshold value, a detected bandwidth not satisfying a bandwidth threshold value, and/or the like) or an outage (e.g., no Internet connection, network components unreachable, and/or the like) in the network 120. Consequent to such detection, the satellite network 122 may be used to transmit software and software updates. In some embodiments, however, the satellite network 122 may be used as a default. Furthermore, the configuration tool 111 may be used in various circumstances, for example, during initial installation of the primary media device 210-1. The configuration tool 111 (which, as disclosed herein, may correspond to a USB drive and/or the like in various embodiments) may be utilized when it is available at the end-user site and/or when no Internet and/or satellite connection is available to adequately transfer software and software updates.

As indicated by block 512, one or more targeting files may be created for the software file that is to be downloaded for particular media devices. In some embodiments, each targeting file may correspond to a JavaScript Object Notation (JSON) file and may be flexible for changing, adding, deleting, and human-readable text. In some embodiments, each targeting file may specify which media devices 210, 212, and/or 214 are to get which software updates. The targeting file information may include one or a combination of file format version, file download ID, file version, media device model specifications, download source type (e.g., whether the download is to be received via the satellite network 122, the network 120, or the configuration tool 111), build type, software file name to download, checksum of a downloaded software file, software file name to check if missing and needs downloaded, checksum of a checked software file, model identification, type of software identification, software version, compatibility software version, targeting software version, and/or the like. In some embodiments, the targeting file may also be signed and encrypted. In some embodiments, one targeting file may be created for one local network at a particular time and therefore may listing software needed by the various media devices 210, 212, and/or 214 in the local network at that time. Other embodiments are possible, such as having one targeting directed to one media device so that multiple targeting files are created, one for each media device targeted.

As indicated by block 514, the targeting file may be transmitted to the primary media device 210. In some embodiments, the transmission may be by way of the satellite network 122, the network 120, or the configuration tool 111 per the above determination. In some embodiments, the targeting file may be sent to the primary media device 210 as a default. Accordingly, the targeting file may be spooled on, and transmitted via, the satellite, or via USB, or may be transferred via the Internet.

As indicated by block 516, the primary media device 210 may receive and store the downloaded targeting file. In some embodiments, the primary media device 210 may perform signature checking and decryption of the targeting file, if it has been signed and encrypted. As indicated by block 518, the targeting file may be read and parsed to determine what files will be downloaded from the download source (e.g., internet server, satellite, or USB). This may include scanning through each model package listed to find new software to download. The targeting information the targeting file, such as what type of software file to download (e.g., system or application), software version to compare, compatibility version between system and application, software version targeting, and/or the like may allow the primary media device 210 to determine if it needs to download listed software download files. As indicated by block 520, new software to download and the linked model may be identified.

In some embodiments, the primary media device 210 may read and parse the targeting file on behalf of the secondary media devices 212 in the local network to determine what software files it needs to download for the secondary media devices 212. The primary media device 210 may differentiate which secondary media device 212 gets what software update. For example, based at least in part on the targeting file listing what software is for which model targeted (e.g., MoCA configuration, Wi-Fi configuration, or configuration tool 111 enabled devices), the primary media device 210 may determine that a MoCA-configured secondary media device 212 in the local network is to get a MoCA-specific update, whereas a Wi-Fi-configured secondary media device 212 in the local network is to get a different update.

However, in some embodiments, the primary media device 210 may communicate the targeting file to the secondary media devices 212 so that each secondary media device 212 may determine for itself which files the secondary media device 212 is to request (if any is needed, if it's not already updated), from the primary media device 210 to download for the secondary media device 212. In some embodiments, the primary media device 210 may communicate the targeting file to the secondary media devices 212 after the primary media device 210 downloads the one or more software files the primary media device 210 needs for itself. In some embodiments, the primary media device 210 may communicate the targeting file to the secondary media devices 212 before the primary media device 210 downloads the one or more software files the primary media device 210 needs for itself (e.g., the primary media device 210 may wait until requests for software files from the secondary media devices 212 are received, and then request all updates needed by the device of the local network at once). Accordingly, in some embodiments, each of the primary media device 210 and the secondary media devices 212 may use the targeting file.

As indicated by block 522, it may be determined from the targeting file whether the primary media device 210 should download the needed software files from satellite, from USB, or from an Internet server. In various embodiments, the primary media device 210 may pull the needed files, for example, with requests to the one or more software repository systems 103, the server system 104, the service provider system 102, the configuration tool 111, and/or the satellite network 122. As indicated by block 524, the one or more software files may be downloaded from the determined source to the primary media device 210.

Accordingly, the primary media device 210 may download from the one or more software repository systems 103 and/or the server system 104 the one or more software files (which may correspond to plug-ins, modules, and/or other code segments, as disclosed herein) for itself and all the secondary media devices 212. This may correspond to one download plurality of files on behalf of the plurality of media devices, with the primary media device 210 being a software collection point for all devices 212 and 214 of the home network.

As indicated by block 526, the primary media device 210 may perform signature checking on the one or more downloaded software files. As indicated by block 528, the primary media device 210 may verify checksum(s) of the one or more downloaded software files. As indicated by block 530, the primary media device 210 may store the one or more download files (e.g., on its hard drive). As indicated by block 532, the primary media device 210 may decrypt any software files that are directed to primary media device 210. This may correspond to a subset of the downloaded software files, with the balance of the subset being directed to other media devices. As indicated by block 534, the primary media device 210 may install the decrypted software files that are directed to primary media device 210. As indicated by block 536, the primary media device 210 may display the software version for the downloaded and/or signed one or more software files. This may involve starting a UI process to display the software versions and other information. Data from the download files may be read and displayed with one or more screens of the UI. For example, each model software file version may be displayed in a diagnostic screen and/or other screens with one or more display devices 114 communicatively coupled to the primary media device 210.

In some embodiments, as indicated by block 538, the primary media device 210 may identify the downloaded software files that are directed to other media devices. In some embodiments, the secondary media device 212 may identify the downloaded software files that are directed to itself and/or other client devices 214 it serves, and may identify the downloaded software files it needs to the primary device 210. In such embodiments, this may correspond to the secondary media device 212 performing the reading and parsing of the targeting file, scanning through each model package listed to find new software to download, similar to the corresponding operations of the primary media device 210 indicated by block 518.

As indicated by block 540, the primary media device 210 may communicate the identified downloaded software files to the other devices (which, in various embodiments, may be responsive to the primary media device 210 identifying the files itself or the secondary media device 212 identifying the files for the primary media device 210). Accordingly, in some embodiments, this may correspond to the primary media device 210 acting as a single distribution point that facilitates one download for a plurality of propagations to other devices of the local network. For example, the primary media device 210 may communicate one or more downloaded software files to a particular secondary media device 212. In some embodiments, the transferring the files from the primary media device 210 to the other devices may correspond to a background service. In some embodiments, a broadcast service job scheduler of a secondary media device 212 may be used to check if an update is available or notify a user that the system was updated.

In some embodiments, as indicated by block 542, the secondary media device 212 may perform signature checking and/or checksum verification on the transferred one or more software files. As indicated by block 544, the secondary media device 212 may decrypt the transferred one or more software files. In some embodiments, this may be done with Android APK software and/or the local device update utility 348. In some embodiments, library code opens the file, reads the media device flash file, reads the internal security key file, and signature checks the file and decrypts and writes data within the same file.

As indicated by block 546, the secondary media device 212 may install the decrypted and transferred software on itself or cause it to be installed on another client device 214. This may include updating the flash partition of the device with the new software. In some instances, an extended boot will boot into a new software partition after the signature check passes. In some embodiments, a decrypted file for one type of software may be provided to the update engine 346, and the update engine 346 may facilitate the installation of system software updates (e.g., system/OTA applications and updates). In some embodiments, a decrypted file for one type of software may be provided to the package installer 347, and the package installer 347 may facilitate the installation of package updates (e.g., APK bundles). As indicated by block 548, the software version may be displayed. This may involve starting a UI process to display the software versions and other information with data from the download files being read and displayed with one or more screens of the UI. For example, each model software file version may be displayed in a diagnostic screen and/or other screens with one or more display devices 114 communicatively coupled to the secondary media device 212.

Figure 6:
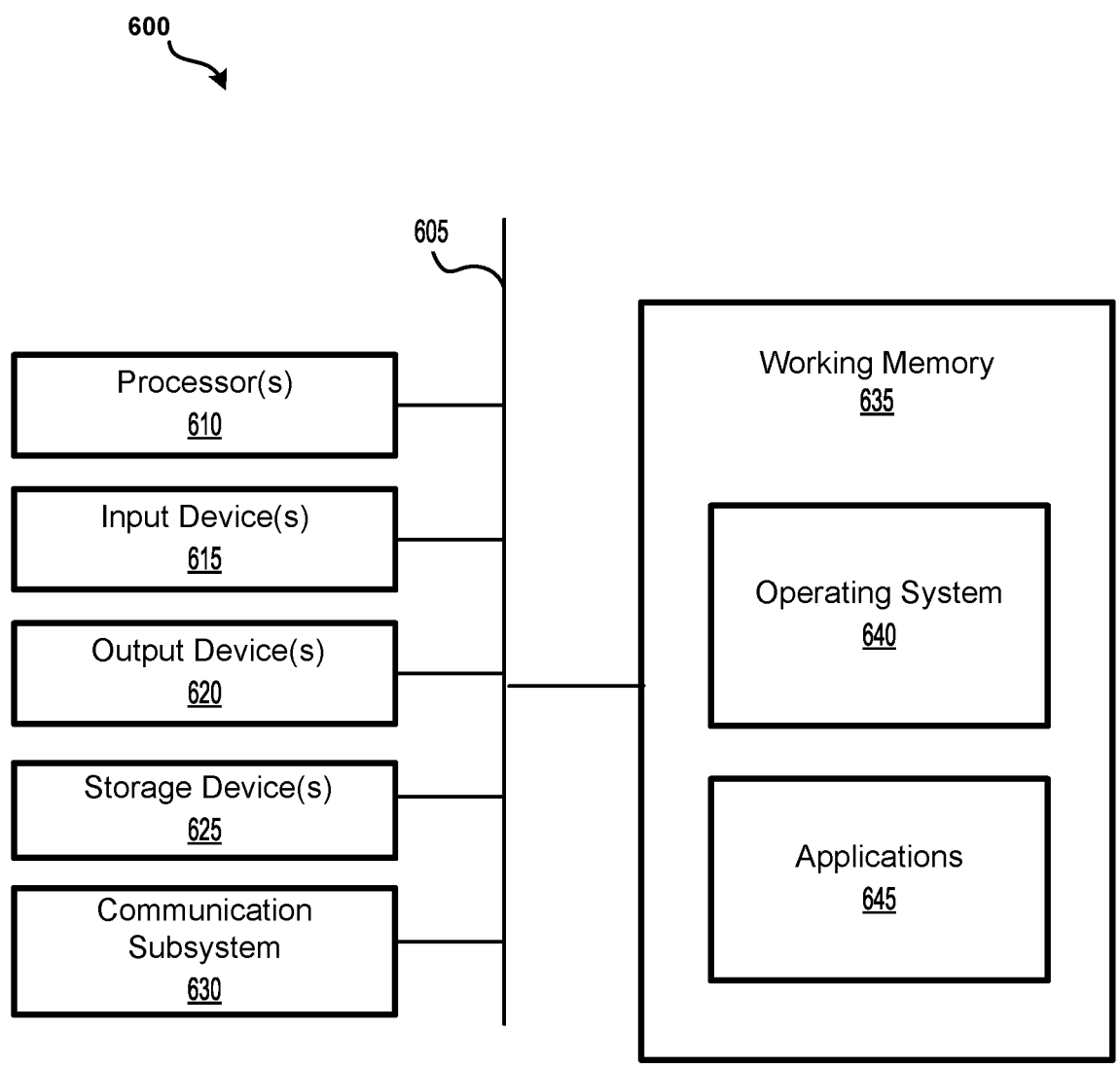
FIG. 6 provides a schematic illustration of one embodiment of a computer system that can implement various system components and/or perform various steps of methods provided by various embodiments.

Embodiments of the primary television receiver 110, configuration tool 111, the primary media device 210, secondary television receiver 112, the secondary media device 212, and/or components thereof, can be implemented on, and/or can incorporate one or more computer systems or at least one or a combination of elements of a computer system as illustrated in FIG. 6. FIG. 6 provides a schematic illustration of one embodiment of a computer system 600 that can implement various system components and/or perform various steps of methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown including hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, video decoders, and/or the like).

As illustrated, some embodiments include one or more input devices 615 and/or output devices 620. The computer system 600 is configured to interface with additional computers, such that the input devices 615 and/or output devices 620 include various physical and/or logical interfaces (e.g., ports, etc.) to facilitate computer-to-computer interaction and control. Embodiments of the input devices 615 and output devices 620 can be configured to implement the television receivers (e.g., the STR 112, the secondary media device 212, the PTR 110 configured with the configuration tool 111, the primary media device configured with the configuration tool 111), so that the computer system 600 can interface with televisions 114, or other receivers in the local network 121.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 625 include the non-transient memory. In some embodiments, the storage devices 625 can include one or more of the settings databases 240 and the information guide database 250.

The computer system 600 can also include a communications subsystem 630, which can include, without limitation, any suitable antennas, transceivers, modems, network cards (wireless or wired), infrared communication devices, wireless communication devices, chipsets (such as a Bluetooth™ device, an 802.11 device, a Wi-Fi device, a WiMAX device, cellular communication device, etc.), and/or other communication components. As illustrated, the communications subsystem 630 generally includes any suitable components for facilitating communications with network 120, televisions 114, satellite dish 108, etc.

In many embodiments, the computer system 600 will further include a working memory 635, which can include a RAM or ROM device, as described herein. The computer system 600 also can include software elements, shown as currently being located within the working memory 635, including an operating system 640, device drivers, executable libraries, and/or other code, such as one or more application programs 645, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

In some embodiments, the operating system 640 and the working memory 635 are used in conjunction with the one or more processors 610 to implement features of the STR 112. Embodiments of the one or more processors 610 can implement one or methods executed by a receiver (e.g., the PTR 110 configured with the configuration tool 111, the primary media device 110 configured with the configuration tool 111, the STR 112, the secondary media device 212), such that the operating system 640 and the working memory 635 can implement features of the PTR 110 configured with the configuration tool 111, the primary media device 110 configured with the configuration tool 111, the STR 112, and/or the secondary media device 212. In some embodiments, the working memory 635 includes non-transient, processor-readable memory having instructions stored thereon, which, when executed, cause the one or more processors 610 to perform steps including: operating as a server in a local network; receiving audio/video (A/V) content via an Internet connection and/or a satellite network connection; serving the A/V content to a set of one or more secondary media devices for display with at least one television of a set of one or more televisions; receiving a set of one or more software updates via the Internet connection and/or the satellite network connection, where one or more software updates of the set of one or more software updates are specified for the set of one or more secondary media devices; transferring, to the set of one or more secondary media devices, the one or more software updates of the set of one or more software updates that are specified for the set of one or more secondary media devices; where the set of one or more secondary media devices: operate as a client with respect to the one or more processing devices in the local network; receive, from the one or more processing devices, the one or more software updates of the set of one or more software updates that are specified for the set of one or more secondary media devices; and install the one or more software updates.

A set of these instructions and/or codes can be stored on a non-transitory computer-readable storage medium, such as the non-transitory storage device(s) 625 described above. In some cases, the storage medium can be incorporated within a computer system, such as computer system 600. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computer system 600 and/or can take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 600) to perform methods in accordance with various embodiments of the disclosure. According to a set of embodiments, some or all of the procedures of such methods are performed by the computer system 600 in response to processor 610 executing one or more sequences of one or more instructions (which can be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 can cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media can be involved in providing instructions/code to processor(s) 610 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 600. The communications subsystem 630 (and/or components thereof) generally will receive signals, and the bus 605 then can carry the signals (and/or the data, instructions, etc., carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system to facilitate updating media devices in a local network with a client-server architecture, the system comprising:
    a primary media device configured to:
        operate as a server in a local network;
        receive audio/video (A/V) content via an Internet connection and/or a satellite network connection;
        serve the A/V content to a set of one or more secondary media devices for display with at least one television of a set of one or more televisions;
        receive a targeting file that comprises specifications of a set of one or more software updates, and determine, from the targeting file and based at least in part on one or more configurations of one or more particular secondary media devices of the set of one or more secondary media devices, which software update is mapped to the one or more particular secondary media devices;
        based at least in part on the determining, receive the set of one or more software updates via the Internet connection, a Universal Serial Bus (USB) connection, and/or the satellite network connection, where one or more software updates of the set of one or more software updates are specified for the set of one or more secondary media devices; and
        transfer, to the set of one or more secondary media devices, the one or more software updates of the set of one or more software updates that are specified for the set of one or more secondary media devices;
    the set of one or more secondary media devices communicatively connected to the primary media device, where each secondary media device of the set of one or more secondary media devices is configured to:
        operate as a client with respect to the primary media device in the local network;
        receive, from the primary media device, the one or more software updates of the set of one or more software updates that are specified for the set of one or more secondary media devices; and
        install the one or more software updates.

2. The system to facilitate updating media devices in a local network with a client-server architecture as recited in claim 1, where the primary media device receives the set of one or more software updates from a server system that is remote from the primary media device.

3. The system to facilitate updating media devices in a local network with a client-server architecture as recited in claim 1, where the primary media device identifies at least part of the set of one or more software updates based at least in part on the targeting file.

4. The system to facilitate updating media devices in a local network with a client-server architecture as recited in claim 3, where the primary media device pulls the one or more software updates of the set of one or more software updates from a server system that is remote from the primary media device on behalf of the set of one or more secondary media devices.

5. The system to facilitate updating media devices in a local network with a client-server architecture as recited in claim 4, where at least one second media device of the set of one or more secondary media devices:
    identifies the one or more software updates of the set of one or more software updates based at least in part on the targeting file; and
    requests the one or more software updates from the primary media device.

6. The system to facilitate updating media devices in a local network with a client-server architecture as recited in claim 4, where the primary media device identifies the one or more software updates of the set of one or more software updates based at least in part on the targeting file.

7. The system to facilitate updating media devices in a local network with a client-server architecture as recited in claim 1, wherein the determining, from the targeting file and based at least in part on one or more configurations of one or more particular secondary media devices of the set of one or more secondary media devices, which software update is mapped to the one or more particular secondary media devices comprises:
    identifying a configuration of at least one secondary media device of the one or more particular secondary media devices;

matching the configuration of the at least one secondary media device to a particular software update specified by the targeting file; and requesting the particular software update on behalf of the least one secondary media device.

8. The system to facilitate updating media devices in a local network with a client-server architecture as recited in claim 7, wherein in the targeting file is not sent to the set of one or more secondary media devices.

9. A method to facilitate updating media devices in a local network with a client-server architecture, the method comprising:

configuring a primary media device to:
  operate as a server in a local network;
  receive audio/video (A/V) content via an Internet connection and/or a satellite network connection;
  serve the A/V content to a set of one or more secondary media devices for display with at least one television of a set of one or more televisions;
  receive a targeting file that comprises specifications of a set of one or more software updates, and determine, from the targeting file and based at least in part on one or more configurations of one or more particular secondary media devices of the set of one or more secondary media devices, which software update is mapped to the one or more particular secondary media devices;
  based at least in part on the determining, receive the set of one or more software updates via the Internet connection, a Universal Serial Bus (USB) connection, and/or the satellite network connection, where one or more software updates of the set of one or more software updates are specified for the set of one or more secondary media devices; and
  transfer, to the set of one or more secondary media devices, the one or more software updates of the set of one or more software updates that are specified for the set of one or more secondary media devices; and configuring the set of one or more secondary media devices to:
  operate as a client with respect to the primary media device in the local network;
  receive, from the primary media device, the one or more software updates of the set of one or more software updates that are specified for the set of one or more secondary media devices; and
  install the one or more software updates.

10. The method to facilitate updating media devices in a local network with a client-server architecture as recited in claim 9, where the primary media device receives the set of one or more software updates from a server system that is remote from the primary media device.

11. The method to facilitate updating media devices in a local network with a client-server architecture as recited in claim 9, where the primary media device identifies at least part of the set of one or more software updates based at least in part on the targeting file.

12. The method to facilitate updating media devices in a local network with a client-server architecture as recited in claim 11, where the primary media device pulls the one or more software updates of the set of one or more software updates from a server system that is remote from the primary media device on behalf of the set of one or more secondary media devices.

13. The method to facilitate updating media devices in a local network with a client-server architecture as recited in claim 12, where at least one second media device of the set of one or more secondary media devices:

identifies the one or more software updates of the set of one or more software updates based at least in part on the targeting file; and requests the one or more software updates from the primary media device.

14. The method to facilitate updating media devices in a local network with a client-server architecture as recited in claim 12, where the primary media device identifies the one or more software updates of the set of one or more software updates based at least in part on the targeting file.

15. One or more non-transitory, machine-readable media having machine-readable instructions thereon which, when executed by one or more processing devices, cause the one or more processing devices to:

operate as a server in a local network;
receive audio/video (A/V) content via an Internet connection and/or a satellite network connection;
serve the A/V content to a set of one or more secondary media devices for display with at least one television of a set of one or more televisions;
receive a targeting file that comprises specifications of a set of one or more software updates, and determine, from the targeting file and based at least in part on one or more configurations of one or more particular secondary media devices of the set of one or more secondary media devices, which software update is mapped to the one or more particular secondary media devices;
based at least in part on the determining, receive the set of one or more software updates via the Internet connection, a Universal Serial Bus (USB) connection, and/or the satellite network connection, where one or more software updates of the set of one or more software updates are specified for the set of one or more secondary media devices; and
transfer, to the set of one or more secondary media devices, the one or more software updates of the set of one or more software updates that are specified for the set of one or more secondary media devices;

where the set of one or more secondary media devices:
  operate as a client with respect to the one or more processing devices in the local network;
  receive, from the one or more processing devices, the one or more software updates of the set of one or more software updates that are specified for the set of one or more secondary media devices; and
  install the one or more software updates.

16. The one or more non-transitory, machine-readable media as recited in claim 15, where the one or more processing devices receive the set of one or more software updates from a server system that is remote from the primary media device.

17. The one or more non-transitory, machine-readable media as recited in claim 15, where the one or more processing devices identify at least part of the set of one or more software updates based at least in part on the targeting file.

18. The one or more non-transitory, machine-readable media as recited in claim 17, where the one or more processing devices pull the one or more software updates of the set of one or more software updates from a server system that is remote from the one or more processing devices on behalf of the set of one or more secondary media devices.

19. The one or more non-transitory, machine-readable media as recited in claim 18, where at least one second media device of the set of one or more secondary media devices:
- identifies the one or more software updates of the set of one or more software updates based at least in part on the targeting file; and
- requests the one or more software updates from the one or more processing devices.

\* \* \* \* \*